(12) United States Patent
Rohozin et al.

(10) Patent No.: US 9,001,074 B2
(45) Date of Patent: Apr. 7, 2015

(54) METHODS AND APPARATUS TO DETERMINE POSITION OF AN INPUT OBJECT

(75) Inventors: Oleksandr Rohozin, Lviv (UA); Victor Kremin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 121 days.

(21) Appl. No.: 13/538,991

(22) Filed: Jun. 29, 2012

(65) Prior Publication Data

US 2014/0002409 A1 Jan. 2, 2014

(51) Int. Cl.
*G06F 3/041* (2006.01)
*G06F 3/0488* (2013.01)

(52) U.S. Cl.
CPC ............ *G06F 3/0488* (2013.01); *G06F 3/0418* (2013.01)

(58) Field of Classification Search
None
See application file for complete search history.

(56) References Cited

U.S. PATENT DOCUMENTS

| | | | |
|---|---|---|---|
| 4,616,107 A * | 10/1986 | Abe et al. ................... | 178/18.06 |
| 7,602,383 B2 | 10/2009 | Hsieh et al. | |
| 7,746,325 B2 | 6/2010 | Roberts | |
| 2006/0114119 A1 * | 6/2006 | Matsumura et al. ........... | 340/825 |
| 2010/0277433 A1 | 11/2010 | Lee et al. | |
| 2011/0025649 A1 | 2/2011 | Sheikhzadeh Nadjar et al. | |
| 2011/0050638 A1 | 3/2011 | Lee | |
| 2011/0193791 A1 * | 8/2011 | Tong et al. ..................... | 345/173 |
| 2011/0279409 A1 | 11/2011 | Salaverry et al. | |
| 2012/0050221 A1 | 3/2012 | Kolokowsky et al. | |
| 2012/0062499 A1 | 3/2012 | Weaver et al. | |
| 2012/0062503 A1 | 3/2012 | Zhuang et al. | |
| 2012/0098783 A1 | 4/2012 | Badaye et al. | |
| 2013/0169947 A1 * | 7/2013 | Hakim et al. ................... | 356/3.1 |

OTHER PUBLICATIONS

International Search Report for International Application No. PCT/US12/53224 dated Nov. 20, 2012; 2 pages.
Written Opinion of the International Searching Authority for International Application No. PCT/US12/53224 mailed Nov. 20, 2012; 5 pages.

* cited by examiner

*Primary Examiner* — William Boddie
*Assistant Examiner* — Bipin Gyawali

(57) ABSTRACT

A method and apparatus receive a plurality of signal values, the plurality of signal values responsive to an input object. The method and apparatus calculate at least one signal ratio value using the plurality of signal values and determine a position of the input object using the at least one signal ratio value.

22 Claims, 13 Drawing Sheets

| SIGNAL RATIO VALUE 404 R = S2-S3/S3-S1 | POSITION 406 |
|---|---|
| $R_{CS2}$ | $X_{CS2}$ |
| ... | ... |
| $R_{EQS2} = 1$ | $X_{EQS2}$ |
| ... | ... |
| $R_{BS2}$ | $X_{BS2}$ |

POSITION DETERMINATION TABLE 402

*FIG. 4*

POSITION DETERMINATION TABLE 1002

| PEAK SIGNAL VALUE, $P_V$ | SIGNAL VALUE, $S_V$ | SIGNAL RATIO VALUE, $P_V/S_V$ | POSITION, Xmm |
|---|---|---|---|
| 1200 | 1200 | 1 | 0 |
| 1200 | 1000 | 1.2 | 2 |
| 1200 | 800 | 1.5 | 4 |

METHODS AND APPARATUS TO DETERMINE POSITION OF AN INPUT OBJECT

TECHNICAL FIELD

The subject matter relates to the field of interpreting user input. More specifically, but not by way of limitation, the subject matter discloses techniques for determining position of an input object.

BACKGROUND

Computing devices, such as notebook computers, personal digital assistants, mobile communication devices, portable entertainment devices (e.g., handheld video game devices, multimedia players), and set-top-boxes (e.g., digital cable boxes, digital video disc (DVD) players) may include user interface devices that facilitate interaction between a user and the computing device.

One type of user interface device that has become more common operates by way of capacitance sensing. A capacitance sensing system may include a touchscreen, touch-sensor pad, a touch-sensor slider, or touch-sensor buttons, and may include an array of one or more capacitive sensor elements. Capacitive sensing typically involves measuring, through sensor signals, a change in capacitance associated with the capacitive sensor elements to determine a presence of a conductive object relative to the capacitive sensor elements. The measured changes in capacitance may be used to calculate a position of the conductive object. The conductive object may be, for example, a stylus or a user's finger.

When sensor elements are expected to provide the same signal response to equivalent inputs, signal variation due to variation in system gain level may be considered signal error. Sensor signals may also include error due to noise (e.g., electrical noise). Presence detection and position calculation that are in error may result when they are based on sensor signals that are in error.

BRIEF DESCRIPTION OF THE DRAWINGS

Some embodiments are illustrated by way of example and not limitation in the figures of the accompanying drawings in which:

FIG. 4 is a chart diagram illustrating a relationship between signal ratio value and position, in accordance with an embodiment;

FIG. 10 is a chart diagram illustrating a relationship between a signal ratio and position, in accordance with an embodiment;

DETAILED DESCRIPTION

Figure 1:
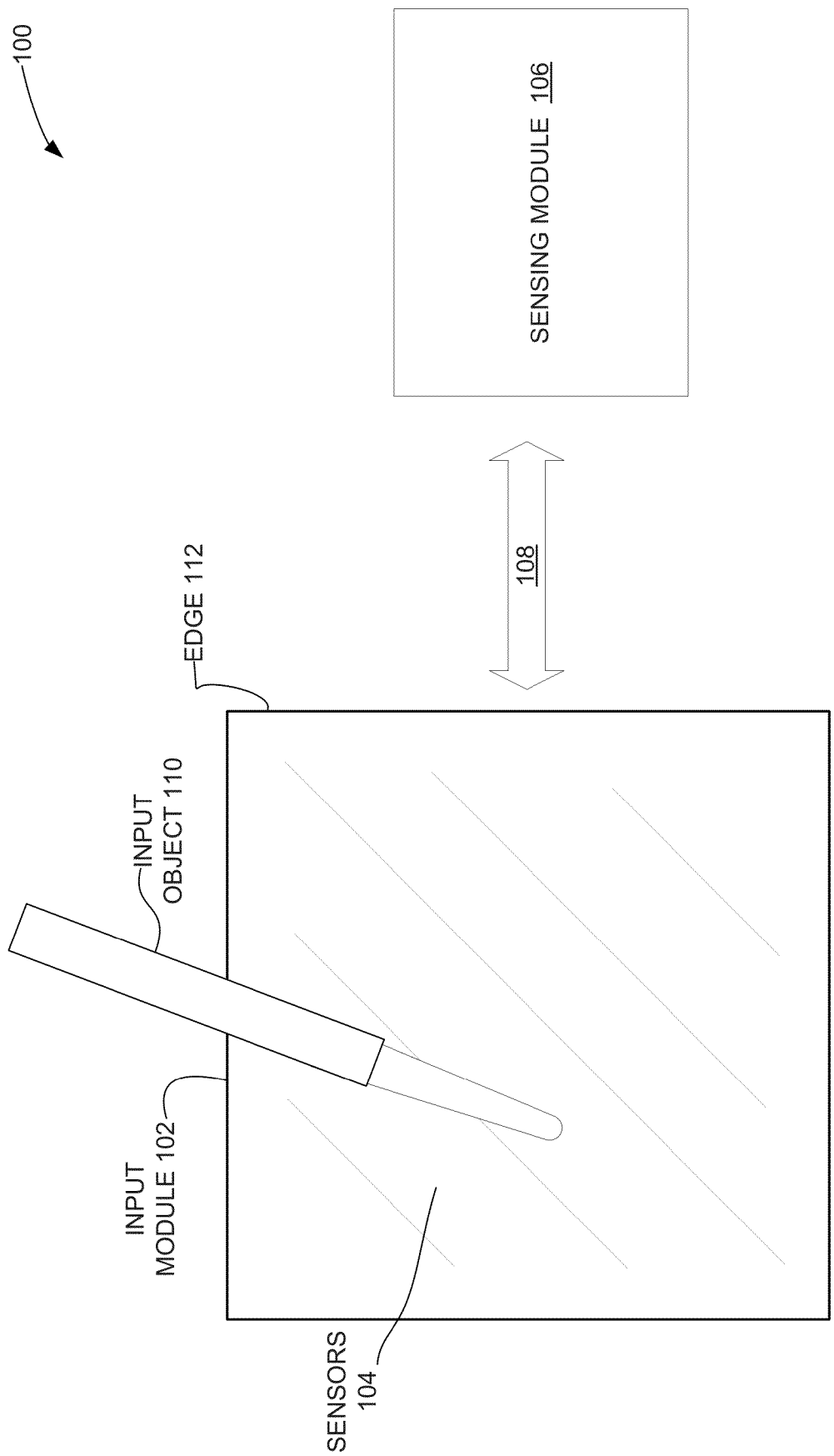
FIG. 1 is a block diagram illustrating an example sensing system, in accordance with various embodiments.

Methods and apparatus to determine position of an input object are discussed. In the following description, for purposes of explanation, numerous examples are set forth in order to provide a thorough understanding of embodiments. It will be evident to one skilled in the art that the claimed subject matter may be practiced in other embodiments.

The detailed description discloses examples of technology that, among other things, utilize one or more signal ratios to improve accuracy and consistency in position determination. Some embodiments are now briefly introduced and then discussed in more detail along with other embodiments beginning with FIG. 1.

Sensor signals provided in response to an input object (e.g., a stylus or finger) on a touchscreen can be used to determine a position of the input object. The position may be determined in error when system gain level vary causing the touchscreen's sensors to respond to the same input object differently at different times. System gain level may change responsive to a change in the touchscreen's electrical grounding conditions. Sensor signals that include noise (e.g., common mode noise) can cause position error and various algorithms used to calculate position can generate algorithmic error that may also contribute to position error.

In various embodiments, the position of an input object can be determined using one or more signal ratios that uniquely represent position of the input object. The unique relationship may be modeled through a mathematical equation or stored in a data structure in memory. In some embodiments, even if signals received responsive to an input object fluctuate due to varying system gain level and/or include a common level of noise, a calculated signal ratio maintains the unique relationship with the accurate position of the input object. An example signal ratio value based on the division of one sensor signal value by another sensor signal value can remove or cancel out system gain variation and noise, while maintaining the unique relationship to position. In an example signal ratio that is a ratio of differences, subtraction can remove additive components of noise and the division can remove multiplicative components of noise, while maintaining the unique relationship to position. Compared to some algorithm based position calculations, position determination described herein reduces a need for further processing to correct for errors caused by common mode noise and/or variation of system gain level. Use of signal ratios to determine position also mitigates problematic jumps in calculated position (e.g., due to signal error between sensors) and algorithmic error that can occur with algorithm based position calculation. In another aspect, when only one useful sensor signal is available (e.g., on an edge of the touchscreen), a signal ratio including a constant signal value and a measured signal value can uniquely represent position.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating an example sensing system 100, in accordance with various embodiments. The sensing system 100 is shown to include an input module 102 coupled to a sensing module 106. The input module 102 is to receive input from an input object 110 (e.g., a stylus). The input module 102 may include a touch pad, a touchscreen, or any other interface. In various embodiments, the sensing system 100 may provide the functionality of a touchscreen, a touchpad, a slider, a button, a switch, a level sensor, a proximity sensor, a displacement sensor, a combination thereof, or provide some other functionality based on a detection of a user input.

The input module 102 is shown to include sensors 104. In various example embodiments, the sensors 104 may include one or more of light-sensitive elements, light emitting elements, photo-sensitive elements, pressure sensitive elements, and/or capacitive sensor elements. In some embodiments, the sensors 104 are embedded into an image display of the input module 102. This is sometimes referred to as in-cell sensing. For example, a photosensitive element may be embedded into each display pixel of the image display. The photosensitive element senses light reflected by an input object back into the cell.

The sensors 104 and/or sensor elements comprising one or more of the sensors 104 may be in the form of various shapes (e.g., lines, diamonds, triangles, snowflakes, and/or other shapes) and organized in various patterns (e.g., intersections, concentric circles, saw tooth, Manhattan, and/or other patterns) without departing from the claimed subject matter. The sensors 104 may comprise all or a portion of the surface area of the input module 102. Some of the sensors 104 may be located adjacent to an edge 112 of the input module 102. The sensors 104 and patterns of the sensors 104 may be formed in one or more layers of the input module 102 as discussed further with respect to FIG. 12. Beginning with FIG. 2, embodiments are introduced in which the sensors 104 are organized along an axis of the input module 102.

An input object 110 is shown to be proximate to the input module 102 of FIG. 1 and is to provide input to the input module 102. In various embodiments, the input object 110 may be a non-conductive object, a conductive object (e.g., a finger or stylus) and/or may produce light or other energy to be sensed through the sensors 104. In an embodiment, the input object 110 is passive meaning that it is not electrically powered to provide input to the input module 102. Alternatively or additionally, the input object 110 may be active meaning that it is electrically powered to provide input to the input module 102. The input object 110 may be fixed in position or moveable in position relative to the input module 102. For example, a user may move the input object 110 relative to the input module 102. The user may include a human, a mechanism, a machine, and/or programmed instructions. Alternatively or additionally, the input module 102 may be allowed to move relative to a fixed or movable input object 110.

Sensors 104 may be activated by the input object 110 and/or noise signals. The sensing module 106 is to sense or detect, through the sensors 104, a presence of one or more input objects proximate one or more of the sensors 104 of the input module 102. The sensing module 106 may perform scan operations to sense, through the sensors 104, signals reflecting pressure applied to the input module 102, light (e.g., infrared light) associated with the input object 110, images of the input object 110, and/or capacitances of the sensors 104 when an input object 110 and/or noise signals are present. In an example scan operation, the sensing module 106 exchanges energy with the input module 102 through the transmission media 108. The transmission media 108 may include any medium through which the energy may be conveyed. For some embodiments, the transmission media 108 includes metal trace (e.g., copper wire) over which current can flow. Alternatively or additionally, the energy may be exchanged over a wireless transmission media.

Figure 2:
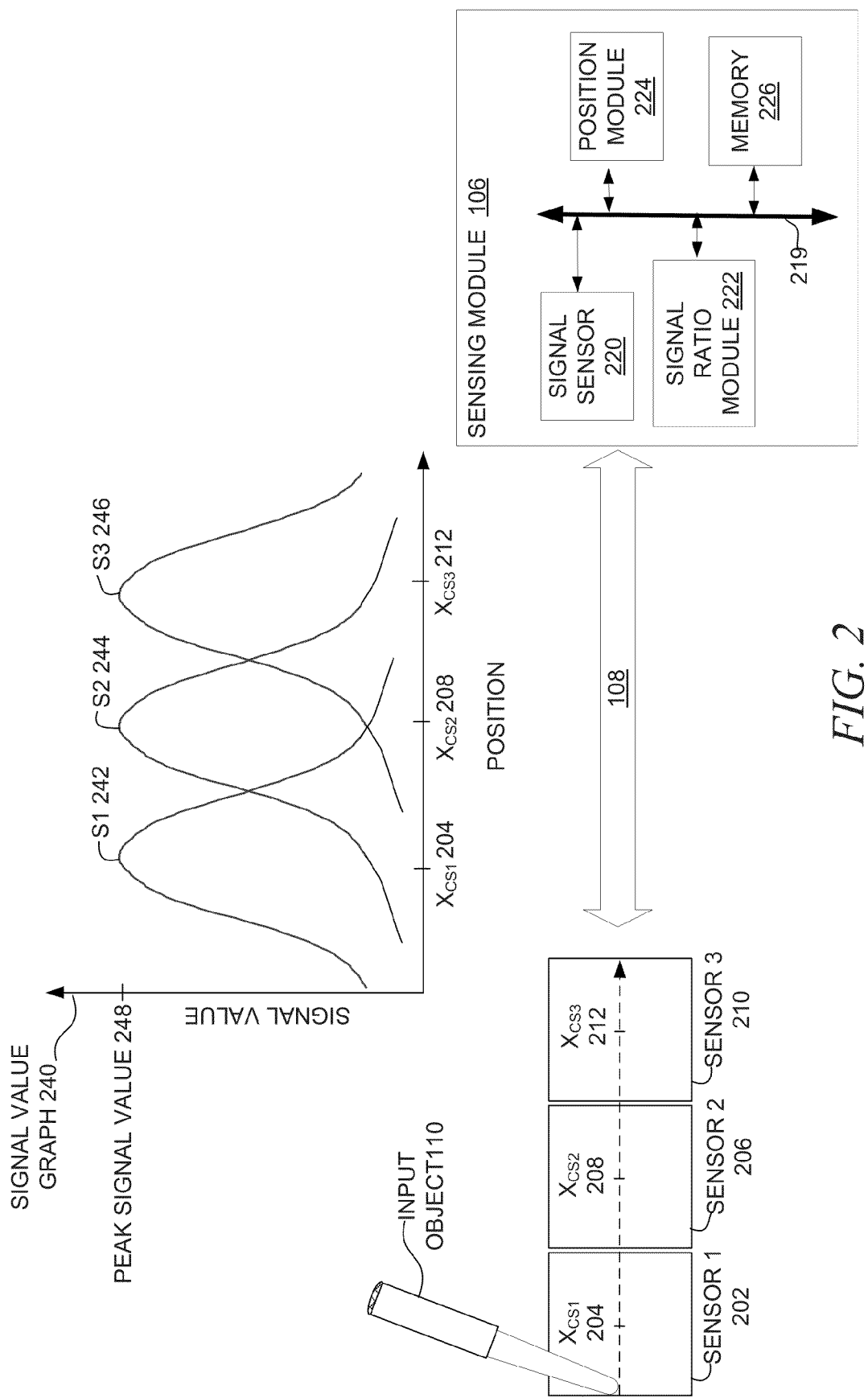
FIG. 2 is a block diagram illustrating sensor signals responsive to an input object, in accordance with embodiments.

In one embodiment of a scan operation, the sensing module 106 applies a voltage to one or more sensor elements (e.g., capacitive sensor elements) of the sensors 104 through the transmission media 108 to form a capacitance. The sensing module 106 may alternatively or additionally detect a current or voltage received from the one or more of the sensors elements. When the input object 110 is moved across sensors 104 of the input module 102, the sensing module 106 senses (e.g., through a scan operation) signals responsively provided by the sensors 104. FIG. 2 introduces example signal responses and how signal ratios can be used to determine a position of the input object 110.

FIG. 2 is a block diagram illustrating sensor signals S1 242, S2 244, and S3 246 responsive to an input object 110, in accordance with embodiments. FIG. 2 illustrates movement of the input object 110 across sensor 1 202, sensor 2 206, and sensor 3 210, which may be all or a portion of the sensors 104 of FIG. 1. A signal value graph 240 illustrates the signals S1 242, S2 244, and S3 246 provided by sensor 1 202, sensor 2 206, and sensor 3 210, respectively, in response to the input object 110. In an embodiment, the signals S1 242, S2 244, and S3 246 are received and processed by the sensing module 106 to determine position.

The sensing module 106 is shown to include a signal sensor 220, a signal ratio module 222, a position module 224, and a memory 226 coupled to one another through a bus 219, any of which may be implemented using hardware, software, or a combination of hardware and software.

The signal sensor 220 is to receive the signals S1 242, S2 244, and S3 246 from sensor 1 202, sensor 2 206, and sensor 3 210, respectively. In an embodiment, the signal sensor 220 performs scan operations described above with respect to FIG. 1 to obtain signals S1 242, S2 244, and S3 246 reflecting a change in capacitance (e.g., mutual capacitance) of the sensor 1 202, sensor 2 206, and sensor 3 210, respectively. In an embodiment, the signal sensor 220 includes an analog-to-digital conversion circuit to convert analog capacitance values to digital capacitance values.

Sensor 1 202, sensor 2 206, and sensor 3 210 are shown to be aligned on an axis (e.g., indicated with arrowed dotted line). The center of sensor 1 202, along the axis, is shown as position $X_{CS1}$ 204, the center of sensor 2 206, along the axis, is shown as position $X_{CS2}$ 208, and the center of sensor 3 210, along the axis, is shown as position $X_{CS3}$ 212. Organization of sensors 104 along other axes (e.g., a y-axis) and position determination along other axes does not depart from the claimed subject matter.

In an embodiment, a signal value for a sensor is at a maximum when an input object is placed in the center (e.g., along the axis) of the sensor. For example, when the input object 110 is at position $X_{CS1}$ 204 the signal value graph 240 shows the signal S1 242 to be at a peak signal value 248 and then decrease as the input object 110 is moved from position $X_{CS1}$ 204 towards position $X_{CS2}$ 208. At the position $X_{CS2}$ 208, the signal value graph 240 shows the signal S2 244 to be at the peak signal value 248 and then decrease as the input object 110 is moved from position $X_{CS2}$ 208 towards position $X_{CS3}$ 212. At position $X_{CS3}$ 212, the signal value graph 240 shows the signal S3 246 to be at the peak signal value 248 and then decrease as the input object 110 is moved away from the position $X_{CS3}$ 212.

As introduced above, sensor signals can cause position error due to common mode noise (e.g. noise distributed relatively equally among sensors) and variations in system gain level. In an example of signal error due to variation in system gain level, the amplitudes (e.g., the peak sensor value 248) of signals S1 242, S2 244, and S3 246 are equally or similarly affected by changes in system gain level. System gain level may change responsive to a change electrical grounding conditions of the sensing system 100 of FIG. 1. In an embodiment, the electrical grounding is when the sensing system 100 rests on a surface (e.g. a table) is different from the electrical grounding when the sensing system 100 is held in a user's hand. In an example of signal error due to common mode noise signals, the amplitudes of signals S1 242, S2 244, and S3 246 are equally or similarly affected by a common noise source (e.g., an electrical noise). The types of signal error just discussed can cause position calculation error when the position calculation technique is sensitive to one or more of these types of signal error.

As will be described in further detail below, a signal ratio value (e.g., a ratio of sensor signals) can uniquely represent a position of the input object 110 and also be all or partially insensitive to variations in system level gain and/or common mode noise. The signal ratio module 222 is to calculate signal ratio values, using the values of signals S1 242, S2 244, and/or S3 246 at a given time (e.g., a time of sampling). In the discussion of the figures below, different example signal ratios are described.

In some embodiments, the unique relationship between signal ratio value and position is determined, at least in part, through a Cartesian robot (not shown) that measures position independent of signals from sensors. In an embodiment, this is a manufacturing process. Each position measured by the robot can be associated with one or more signal ratio values corresponding to that position. The unique relationship between signal ratio value and position may be modeled by a mathematical equation (e.g., an $n^{th}$ order polynomial) and/or stored in the memory 226 as a look-up table. In an embodiment, the signal ratio values corresponding to positions across one sensor (e.g., sensor 2 206) are the same or similar as the signal ratio values corresponding to positions across other sensors (e.g., sensor 1 202 and/or sensor 3 210) and may be used representatively to determine position of the input object 110 across the other sensors.

The position module 224 can use one or more signal ratio values to determine the position of the input object 110. For example, the position module 224 can take as input, a signal ratio value calculated by the signal ratio module 222, and use the signal ratio value, in the mathematical equation and/or the look-up table described above, to return the unique position of the input object 110. In an embodiment, piecewise linear interpolation could be used to determine any positions not stored in the look-up table. An example signal ratio is now introduced with the discussion of FIG. 3. Other example signal ratios are introduced with the discussion of FIGS. 6 and 9, respectively.

Figure 3:
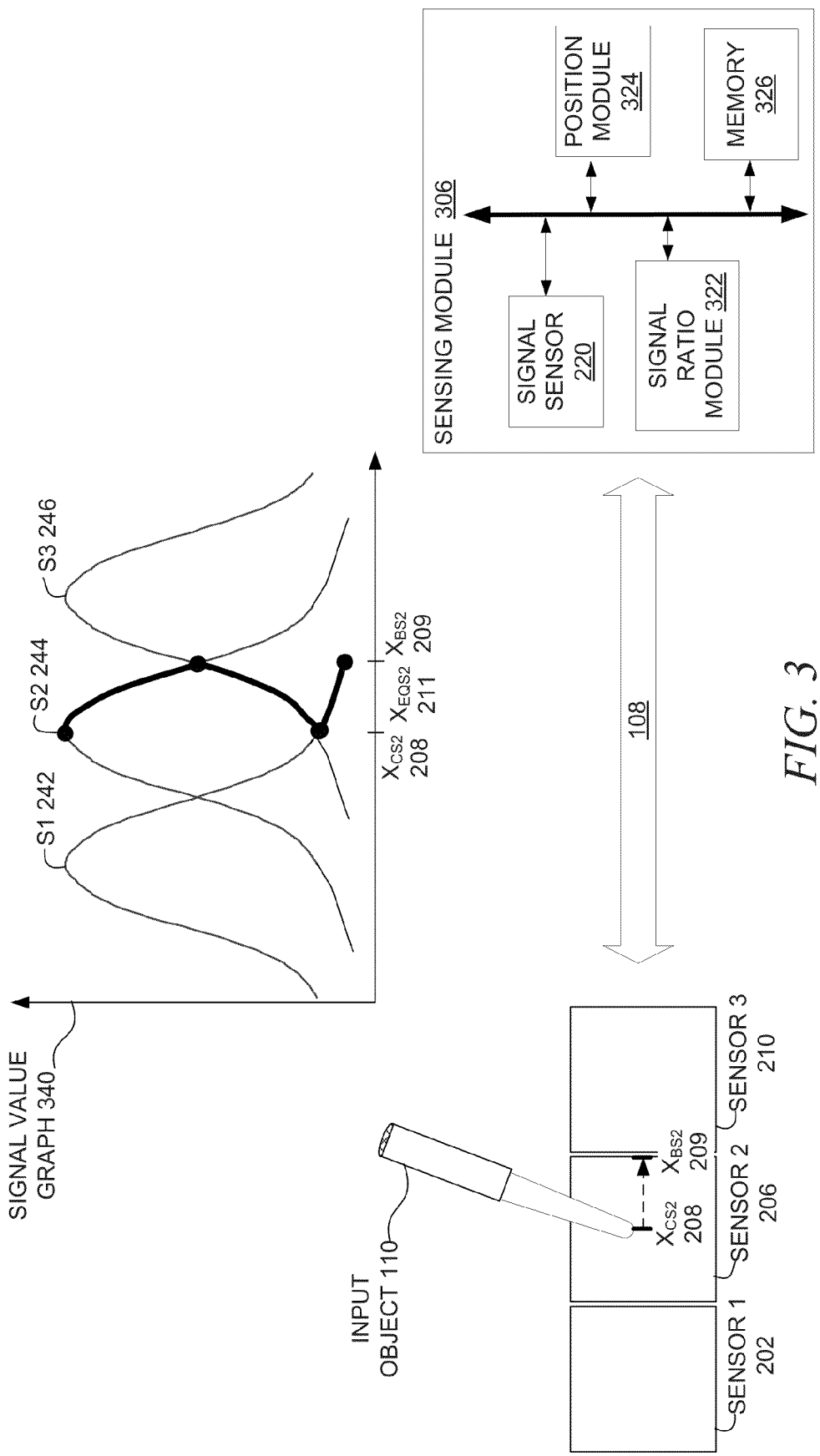
FIG. 3 is a block diagram illustrating sensor signals responsive to an input object, in accordance with an embodiment.

FIG. 3 is a block diagram illustrating sensor signals S1 242, S2 244, and S3 246 responsive to an input object 110, in accordance with an embodiment. FIG. 3 illustrates movement of the input object 110 across sensor 2 206, from the position $X_{CS2}$ 208, at the center of sensor 2 206, to position $X_{BS2}$ 209, at the border of sensor 2 206. The input object 110, the sensor 1 202, the sensor 2 206, the sensor 3 210, the signals S1 242, S2 244, and S3 246, and the transmission media 108 may be the same or similar to those of FIG. 2. The signal value graph 340 highlights, with bold lines, the portions of the signals S1 242, S2 244, and S3 246 that are in response to the input object 110 as it moves from the position $X_{CS2}$ 208 to the position $X_{BS2}$ 209.

In an embodiment, the signal ratio module 322 of the sensing module 306 calculates the signal ratio as a ratio of differences, $$R = \frac{S2 - S3}{S3 - S1} \quad \text{(Equation 1)}$$

In an embodiment, the subtraction in the numerator and denominator of equation (1) reduces an additive component of common mode noise and the division reduces a multiplicative component of the common mode noise. Multiple different signal ratio values of equation (1) can uniquely represent different positions of the input object 110. For example, the signal value graph 340 illustrates that when the input object 110 is at position $X_{CS2}$ 208, the numerator of equation (1), S2-S3, is at a maximum or relatively large value, and the denominator S3-S1 is at a minimum or relatively small value. Thus, the signal ratio of equation (1) is at a maximum or relatively large value at the position $X_{CS2}$ 208. As the input object 110 moves to the right, S2-S3 decreases and S3-S1 increases until, at a position $X_{EQS2}$ 211, S2-S3 equals S3-S1, and the signal ratio of equation (1) has a value of one. When the input object 110 is at position $X_{BS2}$ 209, the numerator of equation (1), S2-S3 is at a minimum or relatively small value, and the denominator S3-S1 is at a maximum or relatively large value. Thus, the signal ratio of equation (1) is at a minimum or relatively small value at the position $X_{BS2}$ 209.

Since the signal ratio of equation (1) goes from a maximum or relatively large value to a minimum or relatively small value between the positions $X_{CS2}$ 208 to $X_{BS2}$ 209, as just described, the positions $X_{CS2}$ 208, $X_{BS2}$ 209, and positions in between can be uniquely identified by a different signal ratio value. It will be noted that a unique relationship between positions along any other axis (e.g., a y-axis) and other signal ratio values (e.g., based on sensors along the y-axis) can be used to determine position using the techniques described herein.

FIG. 4 is a chart diagram illustrating a relationship between signal ratio value and position, in accordance with an embodiment. FIG. 4 is shown to include a position determination table 402 having signal ratio column 404 and a position column 406. The signal ratio column 404 shows that the signal ratio value at the position $X_{CS2}$ is $R_{CS2}$ (e.g., a relatively large signal ratio value), the signal ratio value at the position $X_{EQS2}$ is $R_{EQS2}$, which equals 1 when S2-S3 is equal to S3-S1, and the signal ratio value at the position $X_{BS2}$ is $R_{BS2}$ (e.g., a relatively small signal ratio value). The position determination table 402 may be populated with the number of positions and corresponding signal ratio values that is appropriate for the desired resolution and/or position accuracy of an application.

In an embodiment, the position module 324 of FIG. 3 may receive a signal ratio value (e.g., the signal ratio value $R_{CS2}$) from the signal ratio module 322 and reference the position determination table 402 in the memory 326, to determine the corresponding position (e.g., the position $X_{CS2}$) relative to sensor 2 206. Due to signal symmetry, the signal ratio values of the position determination table 402 can be used to determine position anywhere on sensor 2 206. When the signal ratio values associated with the sensor 2 206 are the same or similar to the signal ratio values of other sensors, the signal ratio values can be used representatively to determine positions on the other sensors (e.g., the sensor 1 202 and/or the sensor 3 210).

Figure 5:
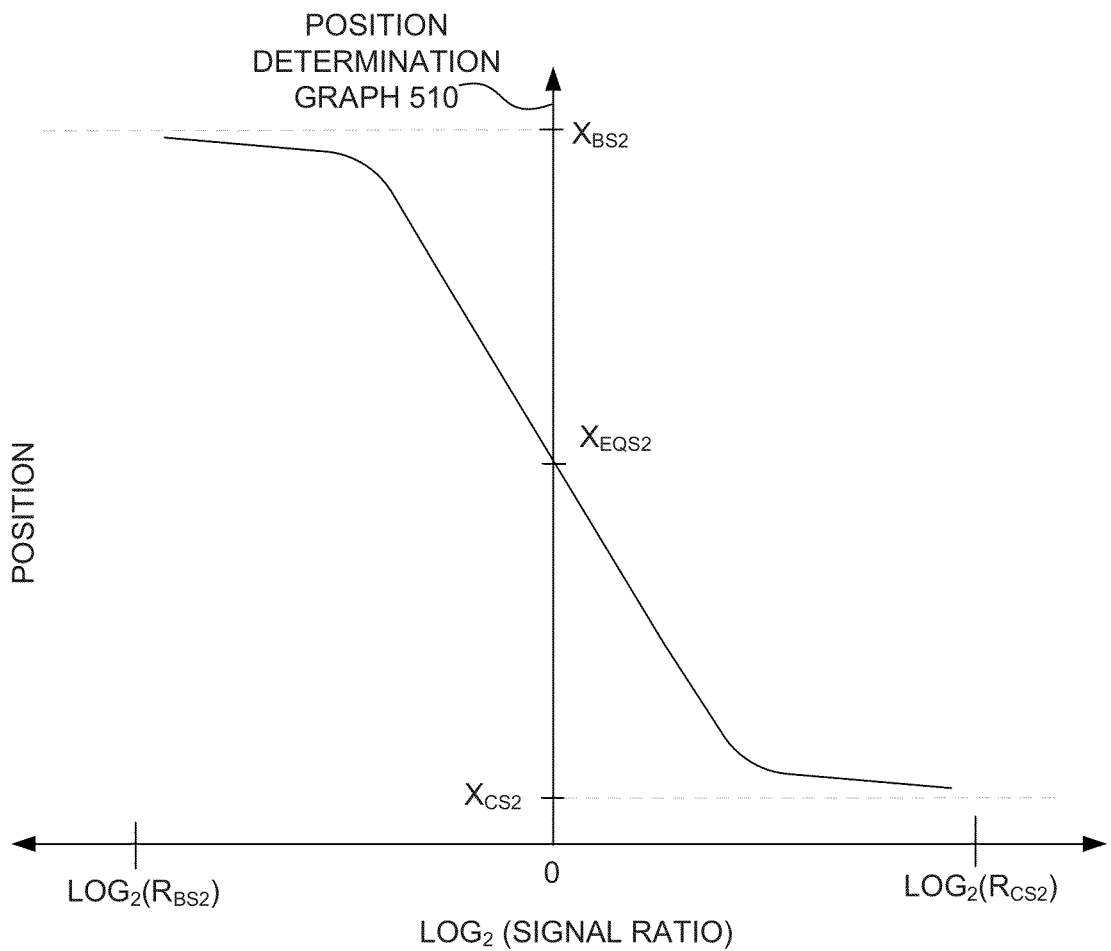
FIG. 5 is shown to include graph and chart diagrams illustrating a relationship between the binary logarithm of the signal ratio and position, in accordance with an embodiment.

As an alternative to working with a linear relationship between signal ratio value and position, with respect to FIG. 5, an embodiment is discussed in which the signal ratio values of equation (1) are expressed as a logarithm and the relationship between the logarithm of the signal ratio value and position is stored in a table. Alternatively or additionally the relationship could be modeled by a mathematical equation.

FIG. 5 is shown to include graph and chart diagrams illustrating a relationship between the binary logarithm of the signal ratio and position, in accordance with an embodiment. The position determination graph 510 reflects position as a function of the binary logarithm of a signal ratio value (e.g., signal ratio value found using equation (1)). The position determination table 520 associates the binary logarithm of a signal ratio value to corresponding position. In an embodiment, the position determination table 520 is stored in the memory 326 of FIG. 3. Column 522 of the position determination table 520 shows the binary logarithm of each signal ratio value, while column 524 of the position determination table shows where the corresponding position falls on the position determination graph 510. In some embodiments, all or a portion of the values in the position determination table 520 are placed in the table prior to its use as a look-up table by the position module 324 of FIG. 3.

In an embodiment, the position module 324 of FIG. 3 receives signal ratio values from the signal ratio module 322 and uses the position determination table 520 to look-up corresponding positions. Referring to the position determination graph 510 and the position determination table 520, when $LOG_2(R)$ approaches $LOG_2(R_{CS2})$, the corresponding position X may be considered equal to $X_{CS2}$. For example, a relatively large positive $LOG_2(R)$ value, or range of $LOG_2(R)$ values, can be set to correspond to the position $X_{CS2}$. Alternatively or additionally, $LOG_2(R)$ can be set to correspond to the position $X_{CS2}$ when the denominator, S3-S1, of equation (1) equals zero. When $LOG_2(R)$ is less than $LOG_2(R_{CS2})$ but greater than zero, the corresponding position will be greater than $X_{CS2}$ but less than $X_{EQS2}$. A $LOG_2(R)$ that is equal to zero corresponds to the position $X_{EQS2}$. When $LOG_2(R)$ is less than zero but greater than $LOG_2(R_{BS2})$, the corresponding position will be greater than $X_{EQS2}$ and less than $X_{BS2}$. When $LOG_2(R)$ approaches $LOG_2(R_{BS2})$, the corresponding position may be considered equal to $X_{BS2}$. For example, a relatively large negative $LOG_2(R)$ value, or range of $LOG_2(R)$ values, can be set to correspond to the position $X_{BS2}$. Alternatively or additionally, $LOG_2(R)$ can be set to correspond to the position $X_{BS2}$ when the numerator, S2-S3, of equation (1) equals zero. It should be noted that the position determination table 520 may include greater or fewer table entries. Although actual values are not shown, the table entries shown could, of course, be replaced with numbers. The signal ratio of equation (1) is but one form of signal ratio that can be used to uniquely identify position of an input object 110. Another form of signal ratio is now introduced with respect to FIG. 6.

Figure 6:
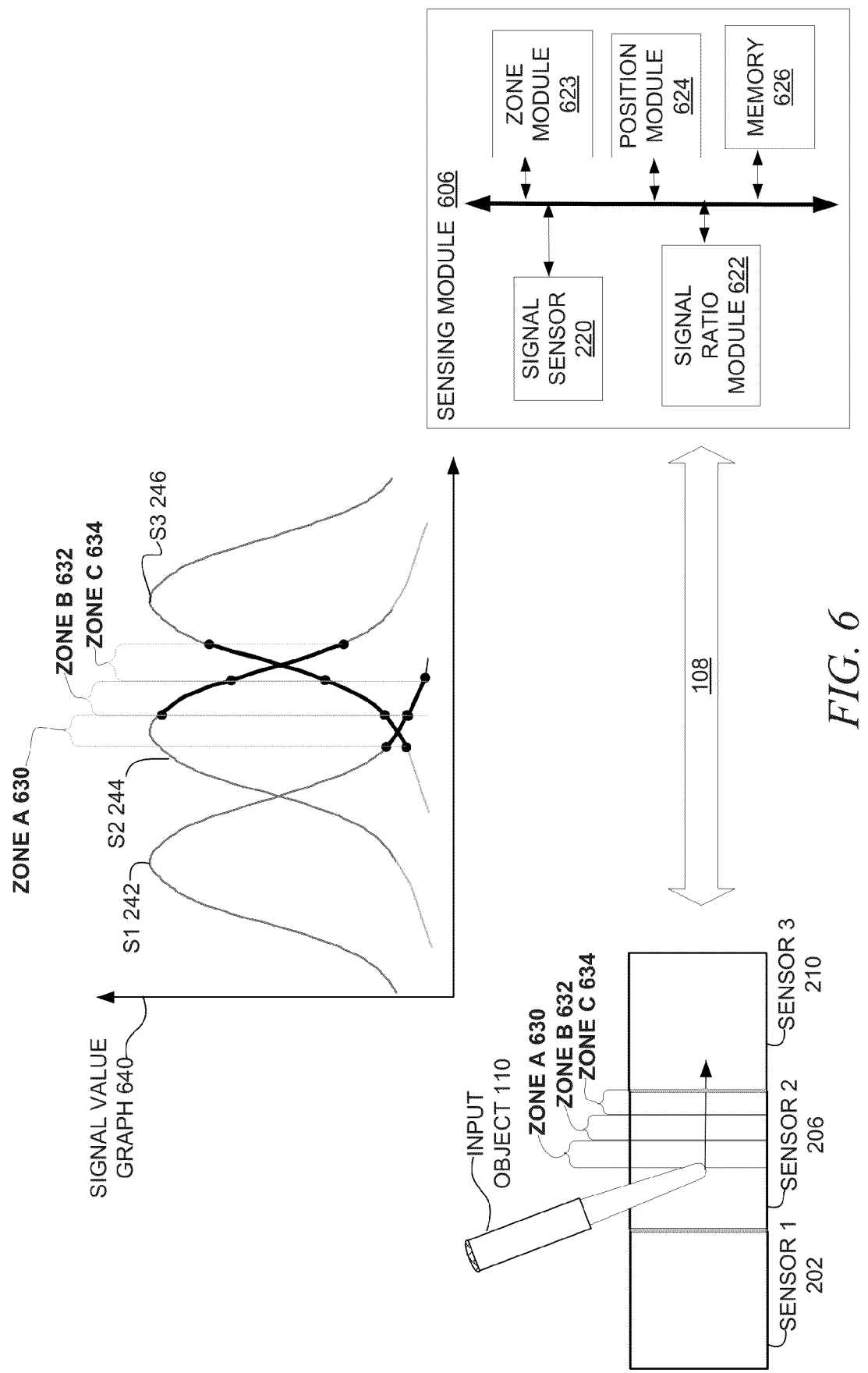
FIG. 6 is a block diagram illustrating sensor signals responsive to an input object in various zones, in accordance with embodiments.

FIG. 6 is a block diagram illustrating sensor signals S1 242, S2 244, and S3 246 responsive to an input object 110 in various zones, in accordance with embodiments. FIG. 6 illustrates movement of the input object 110 across sensor 2 206 from zone A 630 through zone B 632, to zone C 634. Zones A 630, B 632, and C 634 are discussed in more detail below. The input object 110, the sensor 1 202, the sensor 2 206, the sensor 3 210, the signals S1 242, S2 244, and S3 246, and the transmission media 108 may be the same or similar to those of FIG. 2.

In an embodiment, the signal ratio module 622 of the sensing module 606 calculates two signal ratios, $$R_1 = \frac{S1}{S3} \qquad \text{(Equation 2)}$$

$$R_2 = \frac{S2}{S3} \qquad \text{(Equation 3)}$$

In this embodiment, two unique relationships are used per axis, the first relationship being between R1 and position and the second relationship being between R2 and position. For example, where position is to be determined along an x-axis and a y-axis, four unique relationships would be used. Although the techniques could be extended to multiple axes without departing from the claimed subject matter, the discussion below is limited to position determination along one axis. The zone module 623 and position module 624 are discussed in further detail below.

Figure 7:
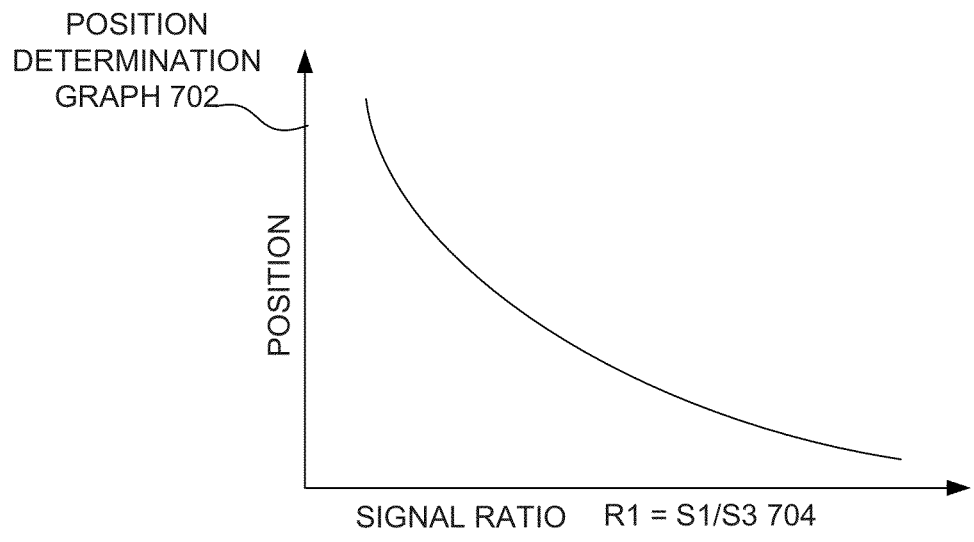
FIG. 7 is a graph diagram illustrating a relationship between signal ratio and position, in accordance with an embodiment.
Figure 7:
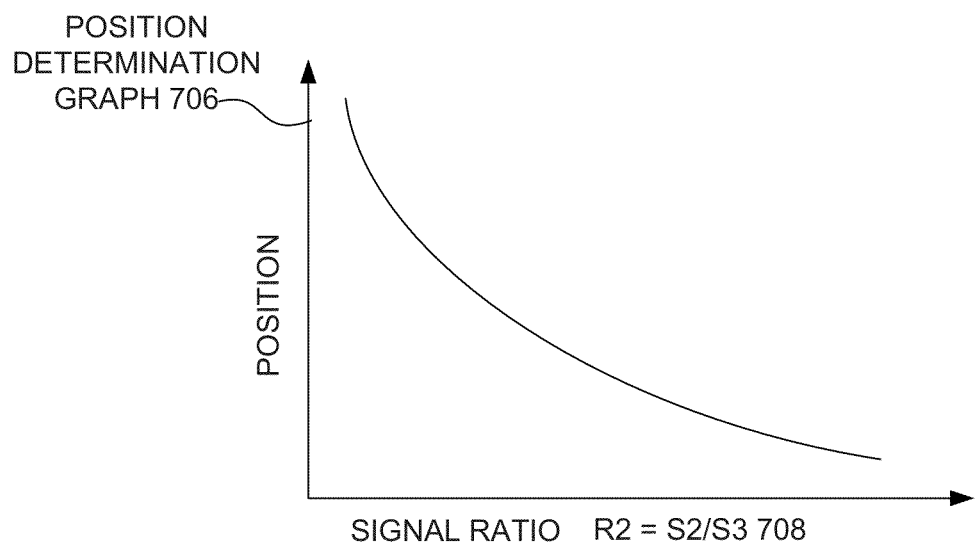

FIG. 7 is a graph diagram illustrating relationships between signal ratio and position, in accordance with an embodiment. In FIG. 7, the position determination graph 702 shows the unique relationship between the signal ratio R1=S1/S3 704 and position, while the position determination graph 706 shows the unique relationship between the signal ratio R2=S2/S3 708 and position. The functions of each position determination graph 702 and 706 can be approximated with an $n^{th}$ order polynomial (e.g., a $3^{rd}$ order polynomial). For example the position module 624 may use coefficients of the polynomial to calculate position (e.g., on an integrated circuit including the position module 624). Alternatively or additionally, the functions may be approximated using piecewise-linear interpolation and a look up table may be created based on it. In an embodiment a 64 element table provides 0.05 mm resolution. Smaller tables (e.g., 16 elements) could be used as compromise between memory consumption and CPU usage. Positions not stored in the table could be found using piecewise-linear interpolation. Due to signal symmetry, the signal ratios of the position determination graphs 702 and 706 can be used to determine position anywhere on sensor 2 206 of FIG. 6 and/or another sensor (e.g., the sensor 1 202 and/or the sensor 3 210).

In an embodiment, a signal ratio more accurately tracks position when the signal ratio's underlying signals have a relatively steep slope as the input object 110 moves within a zone. Referring to the signal value graph 640 of FIG. 6, it can be seen that, in zone A 630, the slope of signals S1 242 and S3 246 (e.g., shown with bold line) are relatively steeper than the slope of signal S2 244, which is relatively flat. In zone A 630, since the signal ratio R1=S1/S3 of equation (2) may yield the more accurate position than the signal ratio R2=S2/S3 of equation (3), the position module 624 uses the signal ratio R1=S1/S3 704 of FIG. 7 to determine position.

In zone B 632, signals S1 242, S2 244, and S3 246 each have sufficiently steep slopes to provide signal ratios R1=S1/S3 of equation (2) and R2=S2/S3 of equation (3) that track position with similar accuracy. As will be described in more detail with respect to FIG. 8, when the input object 110 is in zone B 632, the position module 624 may use both R1=S1/S3 704 of FIG. 7 and R2=S2/S3 708 of FIG. 7 to determine position.

In zone C 634, the slope of the signals S2 244 and S3 246 (shown with bold line) are relatively steeper than the slope of the signal S1 242, which is relatively flat and then drops off. In zone C 634, since the signal ratio R2=S2/S3 of equation (3) yields the more accurate position that the signal ratio R1=S2/S3 of equation (2), the position module uses the signal ratio R2=S2/S3 708 of FIG. 7 to determine position.

The zone module 623 of FIG. 6 is to determine whether the input object 110 is in zone A 630, zone B 632, or zone C 634. The zone module 623 can use a signal value to determine the zone of the input object 110. For example, referring to the signal value graph 640 of FIG. 6, for the signal S2 244, one range of signal values correspond to zone A 630, another range of signal values correspond to zone B 632, and yet another range of signal values correspond to zone C 634. The relationship between signal value and zone may be stored in zone table (not shown) in the memory 626. In an embodiment, the zone module 623 uses a received signal value and references the zone table in the memory 626 to determine whether the input object 110 is in zone A 630, zone B 632, or zone C 634. In some embodiments, the zone module 623 may use one or more of the signals S1 242, S2 244, and S3 246 to determine the zone.

When the zone module 623 determines that the input object 110 is in zone B 632, the position module 624 may determine position using both the signal ratio R1=S1/S3 704 of FIG. 7 and the signal ratio R2=S2/S3 708 of FIG. 7 to smooth the transition between zones A 630 and C 634. One technique for determining position in zone B 632 is now discussed with respect to FIG. 8.

Figure 8:
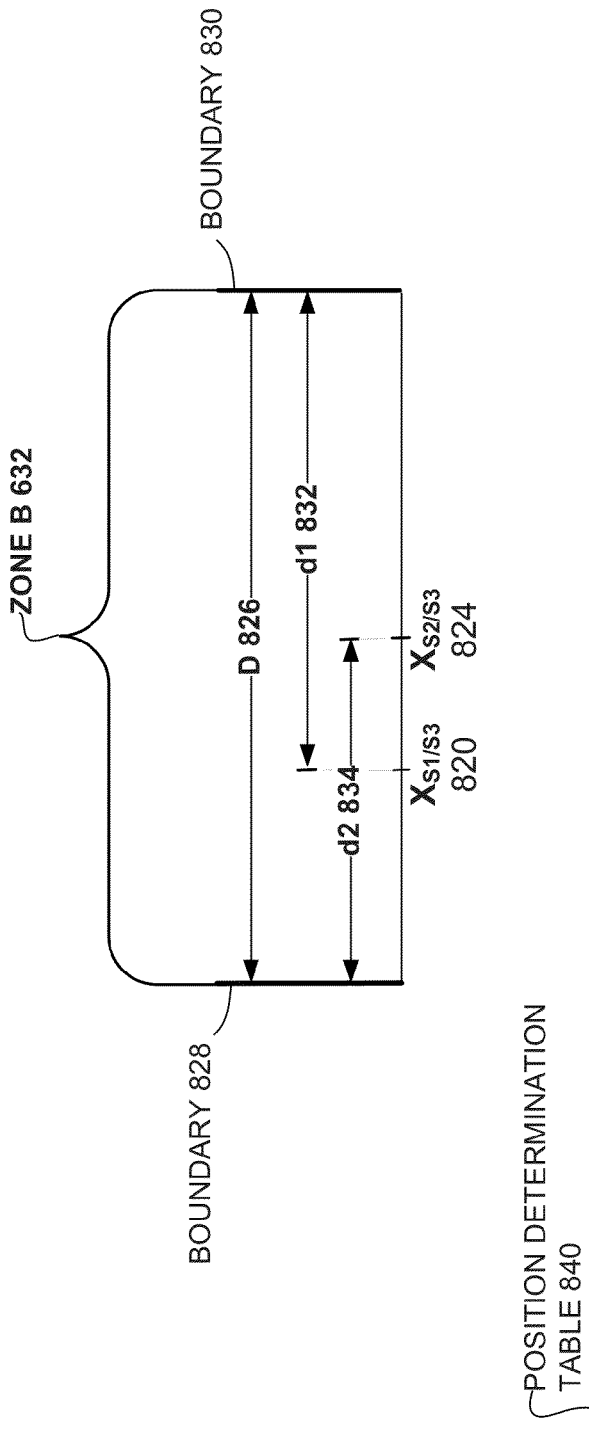
FIG. 8 is shown to include line and chart diagrams illustrating weights to determine a position of an input object in a zone, in accordance with an embodiment.

FIG. 8 is shown to include line and chart diagrams illustrating weights to determine a position of an input object 110 in a zone, in accordance with an embodiment. One technique the position module 624 of FIG. 6 may use to determine position in zone B 632 is now described. When the zone module 623 determines that the input object 110 is in zone B 632, the position module 624 may use the position determination graphs 702 and 706 of FIG. 7 to obtain the positions $X_{S1/S3}$ 820 and $X_{S2/S3}$ 824 shown in zone B 632 of FIG. 8. $X_{S1/S3}$ 820 represents the position corresponding to the signal ratio R1=S1/S3 704 of FIG. 7, and $X_{S2/S3}$ 824 represents the position corresponding to the signal ratio R2=S2/S3 708 of FIG. 7. Zone B 632 of FIG. 8 is shown to include a distance, D 826, which is the width of zone B 632 between its boundaries 828 and 830. The distance, d1 832 of zone B 632 is the distance between the boundary 830 and the position $X_{S1/S3}$ 820, and the distance d2 834 of zone B 632 is the distance between the boundary 828 and the position $X_{S2/S3}$ 824. In an embodiment, the position module 624 of FIG. 6 calculates the position, $X_{ZONEB}$, of the input object 110 in zone B 632 as, $$X_{ZONEB} = \frac{w_1 * X_{S1/S3} + w_2 * X_{S2/S3}}{w_1 + w_2},$$ (Equation 4)

where $w_1$ is a weight factor whose value is determined by d1/D in zone B 632 of FIG. 8, and
$w_2$ is a weight factor whose value is determined by d2/D in zone B 632 of FIG. 8.

Referring to the position determination table 840 of FIG. 8, an example is given where $X_{S1/S3}$ is 3 mm from the boundary 828 and $X_{S2/S3}$ is 5 mm from the boundary 828. In this embodiment, D 826 is 10 mm, resulting in a weight factor, $w_1$ of 0.7 and a weight factor, $w_2$ of 0.5. In this example, the position module 624 would calculate, according to equation (4), a position $X_{ZONEB}$ equal to 3.83 mm. The example illustrates how equation (4) can provide a smooth transition position, $X_{ZONEB}$ (e.g., 3.83 mm) between the positions $X_{S1/S3}$ 820 (e.g., 3 mm) and $X_{S2/S3}$ 824 (e.g., 5 mm) and avoid position jumps that could otherwise occur.

In some embodiments, the input object 110 may be positioned on or near the edge 112 of the input module 102 of FIG. 1. With respect to FIG. 9 an example signal ratio is discussed that is used to determine position near the edge 112.

Figure 9:
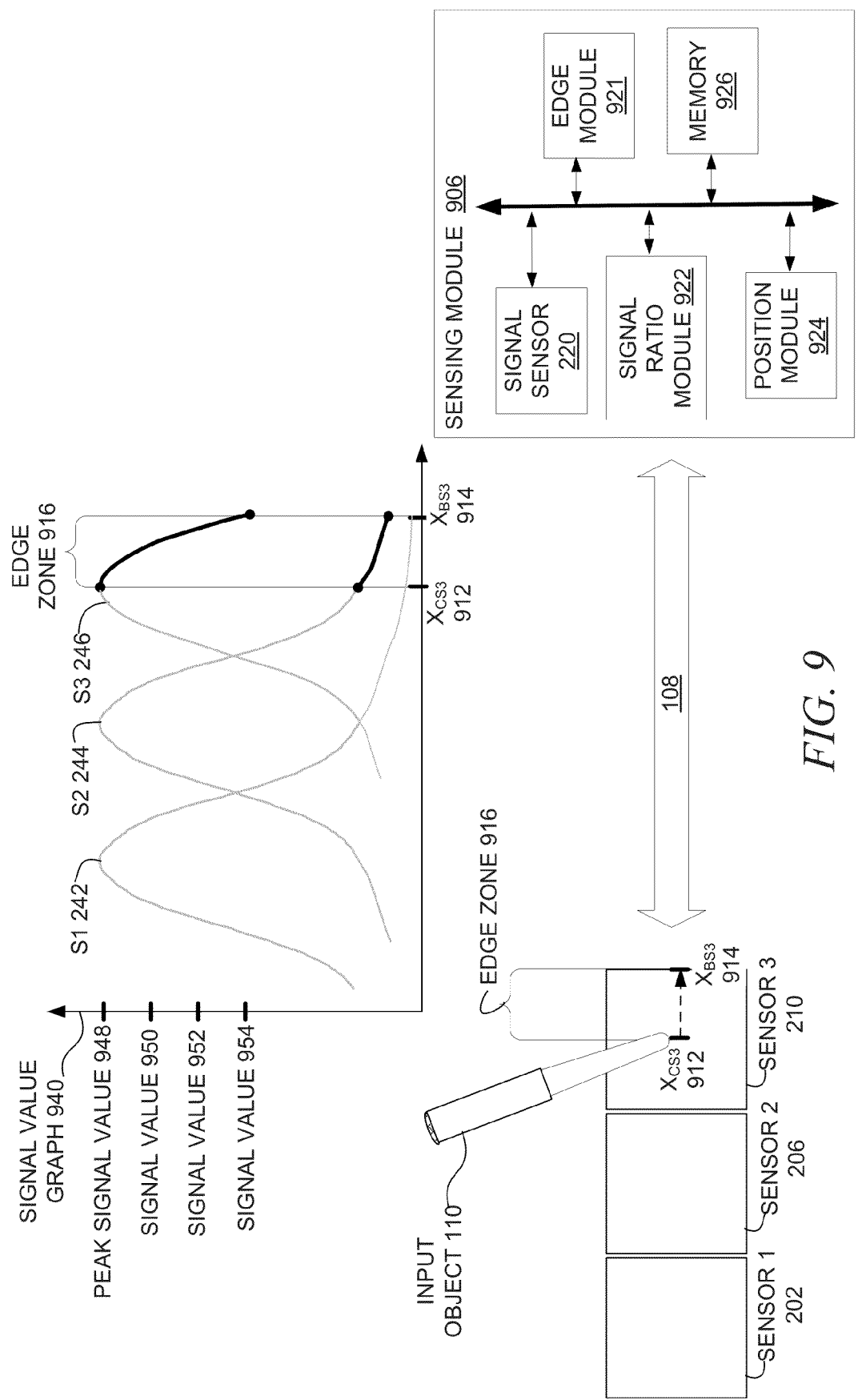
FIG. 9 is a block diagram illustrating sensor signals responsive to an input object in an edge zone 916, in accordance with an embodiment.

FIG. 9 is a block diagram illustrating sensor signals responsive to an input object 110 in an edge zone 916, in accordance with an embodiment. FIG. 9 illustrates movement of the input object 110 across sensor 3 210, from the position $X_{CS3}$ 912, at the center of sensor 3 210, to position $X_{BS3}$ 914, at the border of sensor 3 210. The input object 110, the sensor 1 202, the sensor 2 206, the sensor 3 210, the signals S1 242, S2 244, and S3 246, and the transmission media 108 may be the same or similar to those of FIG. 2. The edge zone 916 represents a zone of the sensor 3 210 and/or a zone of the signals S1 242, S2 244, S3 246 adjacent to the edge 112 of the input module 102 of FIG. 1, where a limited number of useful signals are available. For example, the signal value graph 940 highlights, with bold lines, the portions of the signals S2 244 and S3 246 in response to the input object 110 as it moves, in the edge zone 916, from the position $X_{CS3}$ 912 to the position $X_{BS3}$ 914. In an embodiment, sensor 3 210 is adjacent to the edge 112 of the input module 102 of FIG. 1.

Referring to the signal value graph 940 since, in the edge zone 916, the signal S1 242 is relatively low in amplitude and almost horizontal, the signal S1 242 it is not considered useful for position determination. A signal ratio of S2/S3 is not considered to represent position uniquely in the edge zone 916 because a same signal ratio value is possible for different positions in the edge zone 916. Instead, one signal value may be used in a signal ratio that uniquely represents position.

In this embodiment, the signal ratio module 922 of the sensing module 906 calculates the signal ratio as, $$R = P_V/S_V$$ (Equation 5)

where $P_V$ is a peak sensor value, and
$S_V$ is a signal value of a sensor.

In an embodiment, the peak value $P_V$ is assumed to be the peak value of the sensor that provides the signal value $S_V$. In an embodiment, the peak value $P_V$ is an empirical constant obtained from a representative sensor (e.g., a sensor in the center or core of the input module 102 of FIG. 1).

The edge module 921 of FIG. 9 is to determine whether the input object 110 is in the edge zone 916. In an embodiment, the edge module 921 may use one or more signal values (e.g., signal values 948, 950, 952, and/or 954) of the signals S1 242, S2 244, and S3 246 as an indication of the input object 110 being in the edge zone 916 and/or as an indication as to where in the edge zone 916, the input object 110 is located. When the input object 110 is in the edge zone 916, the signal ratio module 922 of FIG. 9 calculates the signal ratio value of equation (5). For some embodiments, the signal ratio module 922 may calculate one signal ratio value for one part of the edge zone 916 and another signal ratio value for another part of the edge zone 916. For example, referring to the signal value graph 940, the signal ratio module can use S2 244 in equation (5) where S3 246 is almost constant at its peak, and use S3 246 in equation (5) where the signal S2 244 becomes relative low and flat at the edge 112. The position module 924 can then use the calculated signal ratio value to look-up the corresponding position in the memory 926. An example position determination table 1002 is shown in FIG. 10.

FIG. 10 is a chart diagram illustrating a relationship between a signal ratio and position, in accordance with an embodiment. The position determination table 1002 shows that the peak signal value, $P_V$ has a value of 1200, which in this embodiment, is an empirical constant used representatively as the peak of the signal S3 246 of FIG. 9. In the position determination table 1002 of FIG. 10, when the signal value, $S_V$ of the signal S3 246 is equal to 1200, the signal ratio value is 1 and the position module 924 determines the position to be zero. Referring to FIG. 9, the zero position represents the center of sensor 3 210 at the position $X_{CS3}$ 912, where the signal S3 246 has the peak signal value 948. In the position determination table 1002 of FIG. 10, when the signal value, $S_V$ of the signal S3 246 is equal to 1000, the signal ratio value is 1.2 and the position is 2 mm from the zero position. Referring to FIG. 9, the 2 mm position (not shown) corresponds to the signal value 950 of 1000. Referring again to the position determination table of FIG. 10, when the signal value, $S_V$ of the signal S3 246 is equal to 800, the signal ratio value is 1.5 and the position is 4 mm from the zero position. In FIG. 9, the 4 mm position (not shown) corresponds to the signal value 952 of 800.

The peak signal value at the center of the input module 102, which is used as the empirical constant $P_V$, can sometimes change during operation of a sensing system (e.g. a mobile phone, tablet, etc.). For example, when a user places the sensing system on a surface instead of holding it in the hand, the system gain level can drop and decrease signal values provided by all or a portion of the sensors 104. Without updating the peak signal value $P_V$ in the position determination table 1002, calculated signal ratio values, based on signal values $S_V$ having lower amplitudes, will report incorrect positions. In an embodiment, the peak signal value in the center of the input module 102 is monitored and used to update the peak signal value, $P_V$ in the position determination table 1002 periodically and/or on-demand so that the peak signal value at the center or core of the input module 102 can be accurately represented.

Figure 11:
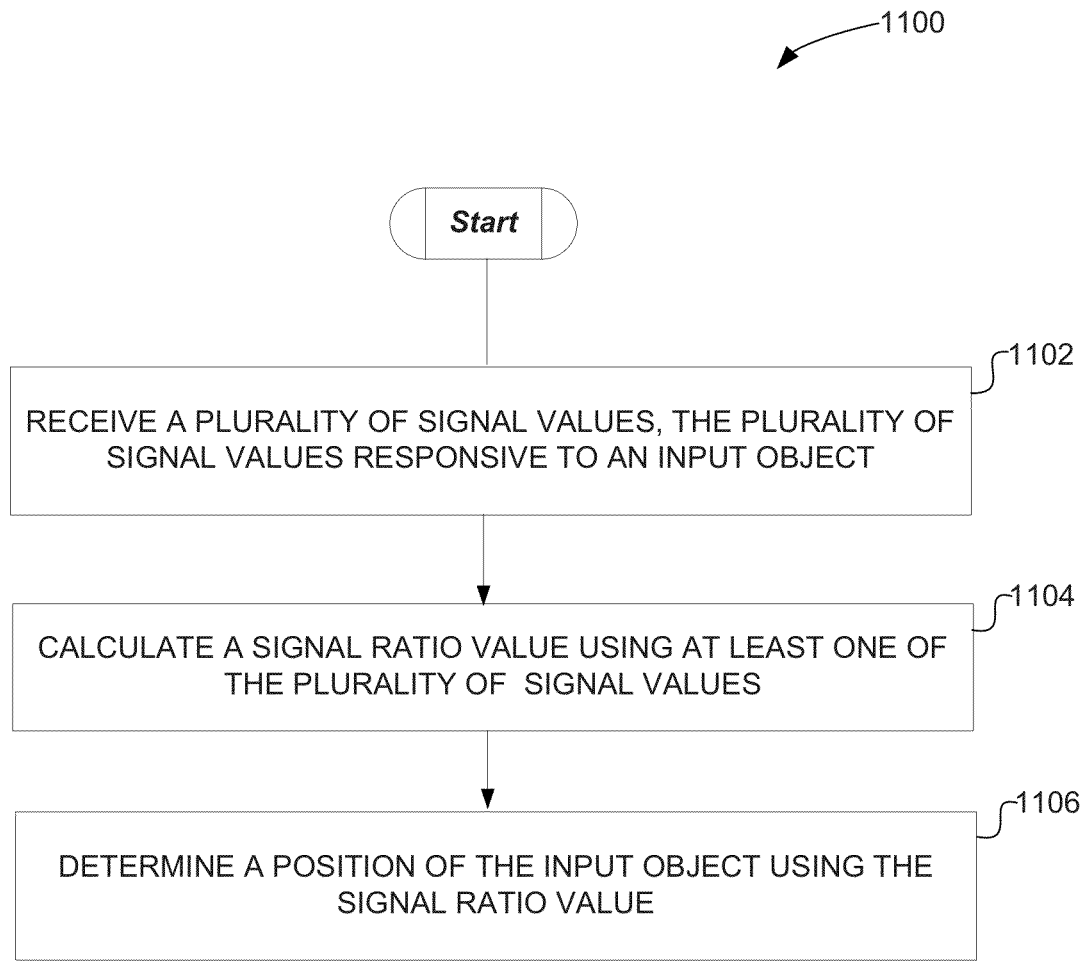
FIG. 11 is a flow diagram illustrating a method of determining position of an input object, in accordance with an embodiment.

FIG. 11 is a flow diagram illustrating a method of determining position of an input object 110, in accordance with an embodiment. A description of the method 1100 refers to components of drawings referred to above for the purpose of explanation and not to limit the claimed subject matter. It will be noted that the methods described herein may be performed by hardware, software, or a combination of hardware and software.

At block 1102, the method 1100 includes receiving a plurality of signal values, the plurality of signal values responsive to an input object. At block 1104, the method 1100 includes calculating at least one signal ratio value using the plurality of signal values. At block 1106, the method 1100 includes determining a position of the input object using the at least one signal ratio value. Referring to FIG. 3, the signal ratio module 322 may calculate the at least one signal ratio value as a ratio of differences between different signal values of the plurality of signal values. The plurality of signal values may include values of the signals S1 242, S2 244, and S3 246.

In an embodiment, the signal ratio module 322 calculates the ratio of differences of equation (1) through dividing a difference between the signal value S2 244 and the signal value S3 246 by a difference between the signal value S2 244 and the signal value S1 242. With the signal ratio value calculated, the position module 324 can select the position of the input object 110 that corresponds to the signal ratio value. In one embodiment, the position module 324 of FIG. 3 may use the calculated signal ratio value to lookup, in a table (e.g., the position determination table 520 of FIG. 5), a position that corresponds to the calculated signal ratio value. Alternatively or additionally, the position module 324 may determine the position of the input object 110 by solving a model equation that tracks the relationship (e.g., shown in the position determination graph of FIG. 5) between signal ratio (e.g., the binary logarithm of the signal ratio) and position.

In an embodiment, the signal ratio module 622 of FIG. 6 calculates the signal ratio value of equation (1) through dividing the signal value S1 242 of FIG. 6 by the signal value S3 246 of FIG. 6, and calculates the signal ratio value of equation (2) through dividing the signal ratio value S2 244 of FIG. 6 by the signal value S3 246 of FIG. 6.

The determining of the position of the input object 110 using the signal ratio value of block 1104 may include determining which signal ratio value to use to determine the position. For example, the zone module 623 of FIG. 6 may determine, based on one or more of the underlying signal values of signals S1 242, S2 244, and/or S3 246 of FIG. 6, whether to use one or both of the calculated signal ratio values to determine the position of the input object 110. For example, if the zone module 623 of FIG. 6 determines that the value of S2 244 indicates the input object 110 in zone A 630 of FIG. 6, then the position module 624 of FIG. 6 may use the signal ratio S1/S3 704 of FIG. 7 determine position. If the zone module 623 of FIG. 6 determines that the value of S2 244 indicates the input object 110 in zone C 634 of FIG. 6, then the position module 624 of FIG. 6 may use the signal ratio S2/S3 708 of FIG. 7 to determine position.

If the zone module 623 determines that the value of S2 244 indicates the input object 110 in zone B 632 of FIG. 6, then the position module 624 of FIG. 6 may use both the signal ratios S1/S3 704 and S2/S3 708 of FIG. 7 to determine position of the input object 110. In an embodiment, the signal ratio values S1/S3 704 and S2/S3 708 of FIG. 7 correspond to different positions $X_{S1/S3}$ 820 and $X_{S2/S3}$ 824 of the input object 110 in zone B of FIG. 8. In an embodiment, the position module 624 of FIG. 6 calculates the position $X_{ZONEB}$ of the input object 110 of FIG. 6 as a function of the different positions $X_{S1/S3}$ 820 and $X_{S2/S3}$ 824 of FIG. 8. As shown in equation (4) and FIG. 8, the function for calculating $X_{ZONEB}$ includes a weight factor applied to each position $X_{S1/S3}$ 820 and $X_{S2/S3}$ 824 is determined based on where those positions are located relative to the boundaries 828 and 830 of zone B 632.

As introduced above, to allow only one measured signal value to be used to determine position, one signal value (e.g., S2 244 or S3 246 of FIG. 9) and a peak signal value (e.g., the peak signal value 948 of FIG. 9) can be used as a constant in the signal ratio of equation (5). FIG. 10 shows an example position determination table 1002 associating such signal ratio values to position. In some embodiment, the position values may be updated from time to time to account for any fluctuations in the sensor values caused by variation of system gain level. In an embodiment, when it is determined (e.g., by the edge module 921 of FIG. 9) that the input object 110 is in an edge zone of the input module 102 of FIG. 1, the signal ratio module 922 of FIG. 9 may calculate the at least one signal ratio value of equation (5) through dividing the peak signal value 948 by a value (e.g., the signal value 950) of the signal S3 246 in the edge zone 916 of FIG. 9. The position module 924 of FIG. 9 may then look up, in the position determination table 1002 of FIG. 10, a position of the input object 110 of FIG. 9 that corresponds to the calculated signal ratio value.

Through the embodiments described herein, when sensor signals are provided responsive to an input object, the position of the input object can be determined using one or more signal ratios that uniquely represent position of the input object. As just described, when only one useful sensor signal is available, a signal ratio including a constant signal value and a measured signal value can uniquely represent position. In some embodiments, even if the signals include a common level of noise and there is variation of system gain level, the signal ratio maintains the unique relationship with the accurate position of the input object. For example, dividing one sensor signal value by another sensor signal value can remove variations in gain and multiplicative components of noise. When subtraction is also used to calculate signal ratio, the subtraction can remove additive components of noise. Compared to some algorithm-based position calculations, position determination described herein reduces a need for further processing to correct for errors caused by common mode noise and/or system gain level variations. Use of signal ratios to determine position also mitigates problematic jumps in calculated position (e.g., due to signal error) and algorithmic error that can occur with algorithm based position calculation.

Figure 12:
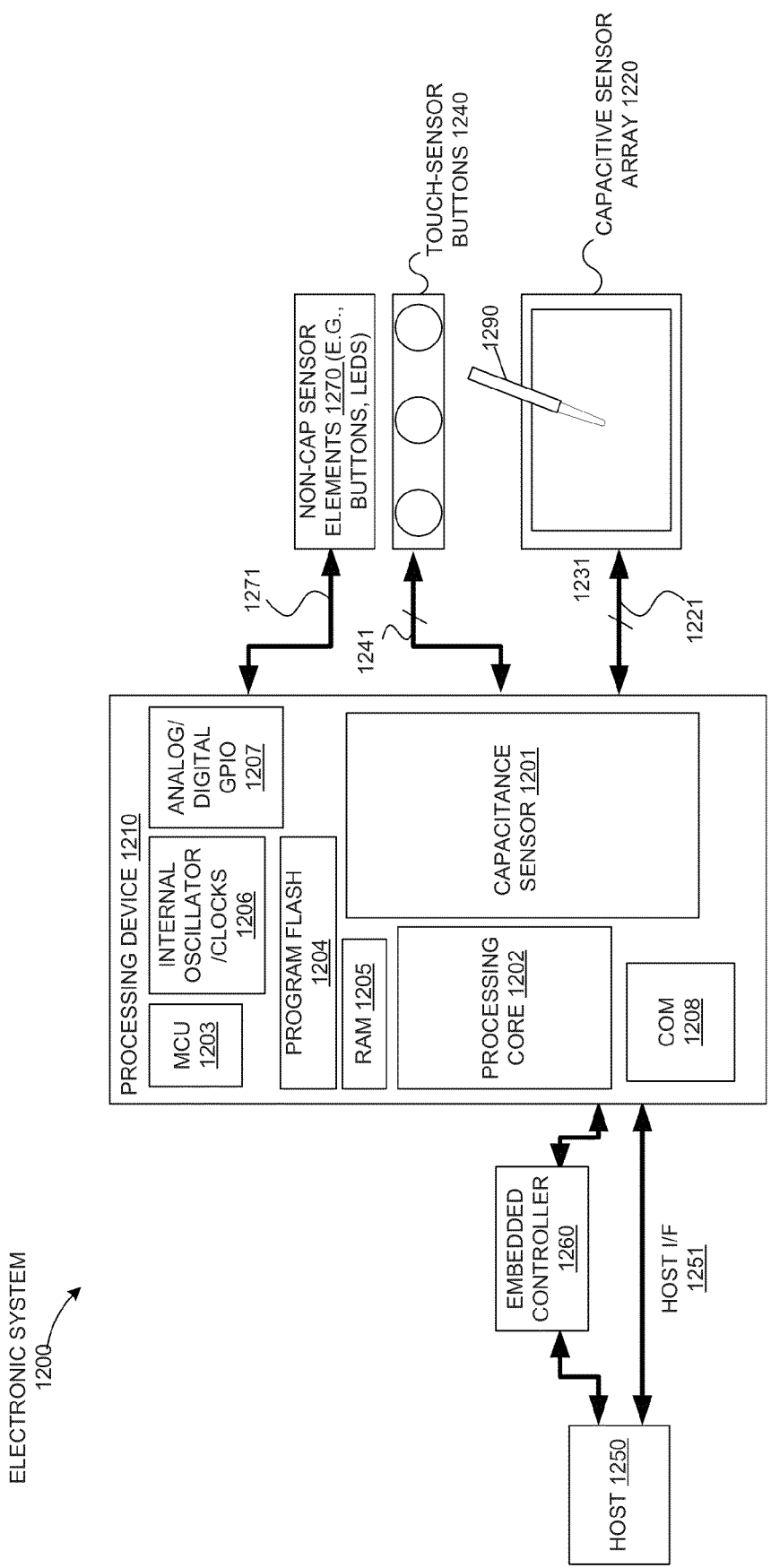
FIG. 12 is a block diagram illustrating an electronic system to detect a presence of a conductive object on a capacitive sensor array, in accordance with various embodiments.

FIG. 12 is a block diagram illustrating an electronic system 1200 to detect a presence of a conductive object on a capacitive sensor array 1220, in accordance with various embodiments. The electronic system 1200 includes a processing device 1210, the capacitive sensor array 1220, touch-sensor buttons 1240, host processor 1250, embedded controller 1260, and non-capacitance sensor elements 1270. The processing device 1210 may include analog and/or digital general purpose input/output ("GPIO") ports 1207. GPIO ports 1207 may be programmable. The digital block array may be configured to implement a variety of digital logic circuits (e.g., DACs, digital filters, or digital control systems) using, in one embodiment, configurable user modules ("UMs"). The digital block array may be coupled to a system bus. Processing device 1210 may also include memory, such as random access memory ("RAM") 1205 and program flash 1204. RAM 1205 may be static RAM ("SRAM"), and program flash 1204 may be a non-volatile storage, which may be used to store firmware (e.g., control algorithms executable by processing core 1202 to implement operations described herein). The memory may include instructions that when executed perform the method described herein. Processing device 1210 may also include a microcontroller unit ("MCU") 1203 coupled to memory and the processing core 1202.

As illustrated, capacitance sensor 1201 may be integrated into processing device 1210. Capacitance sensor 1201 may include analog I/O for coupling to an external component, such as capacitive sensor array 1220, touch-sensor buttons 1240, and/or other devices. Capacitance sensor 1201 and processing device 1210 are described in more detail below.

The embodiments described herein can be used in any capacitive sensor array application, for example, the capacitive sensor array 1220 may be a touch screen, a touch-sensor slider, or touch-sensor buttons 1240 (e.g., capacitance sensor buttons). The operations described herein may include, but not be limited to, notebook pointer operations, lighting control (dimmer), volume control, graphic equalizer control, speed control, or other control operations requiring gradual or discrete adjustments. It will also be noted that these embodiments of capacitive sense implementations may be used in conjunction with non-capacitive sensor elements 1270, including but not limited to pick buttons, sliders (ex. display brightness and contrast), scroll-wheels, multi-media control (ex. volume, track advance, etc) handwriting recognition and numeric keypad operation.

In one embodiment, the electronic system 1200 includes a capacitive sensor array 1220 of sensor elements coupled to the processing device 1210 via bus 1221. In an embodiment, the capacitive sensor array may include sensor elements 104 of FIG. 1. The capacitive sensor array 1220 of the sensor elements may include a one-dimensional sensor array in one embodiment and a two dimensional sensor array in another embodiment. Alternatively or additionally, the capacitive sensor array 1220 of the sensor elements may have more dimensions. The capacitive sensor array 1220 may employ projected capacitive technology in which the capacitive sensor elements of the capacitive sensor array are formed in one or more capacitive sensor layers upon a substrate (not shown) of the capacitive sensor array 1220. For example, the capacitive sensor elements may be patterned over an image display (e.g., a liquid crystal display) in one or more layers of transparent conducting film deposited on a glass substrate. A protective transparent layer (e.g., glass or plastic film) may cover the capacitive sensor elements to shield them from environmental damage.

Also, in one embodiment, the capacitive sensor array 1220 of the sensor elements may be sliders, touchpads, touch screens or other sensing devices. In another embodiment, the electronic system 1200 includes touch-sensor buttons 1240 coupled to the processing device 1210 via bus 1241. Touch-sensor buttons 1240 may include a single-dimension or multi-dimension sensor array. The single- or multi-dimension sensor array may include multiple sensor elements. For a touch-sensor button, the sensor elements may be coupled together to detect a presence of a conductive object over the entire surface of the sense device. Alternatively, the touch-sensor buttons 1240 may have a single sensor element to detect the presence of the conductive object. In one embodiment, touch-sensor buttons 1240 may include a capacitive sensor element. Capacitive sensor elements may be used as non-contact sensor elements. These sensor elements, when protected by an insulating layer, offer resistance to severe environments.

The electronic system 1200 may include any combination of one or more of the capacitive sensor array 1220, and/or touch-sensor button 1240. In another embodiment, the electronic system 1200 may also include non-capacitance sensor elements 1270 coupled to the processing device 1210 via bus 1271. The non-capacitance sensor elements 1270 may include buttons, light emitting diodes ("LEDs"), and other user interface devices, such as a mouse, a keyboard, or other functional keys that do not require capacitance sensing. In one embodiment, busses 1271, 1241, 1231, and 1221 may be a single bus. Alternatively, these buses may be configured into any combination of one or more separate buses.

Processing device 1210 may include internal oscillator/clocks 1206 and communication block ("COM") 1208. The oscillator/clocks block 1206 provides clock signals to one or more of the components of processing device 1210. Communication block 1208 may be used to communicate with an external component, such as a host processor 1250, via host interface ("I/F") line 1251. Alternatively, processing device 1210 may also be coupled to the embedded controller 1260 to communicate with the external components, such as host processor 1250. In one embodiment, the processing device

1210 is configured to communicate with the embedded controller 1260 or the host processor 1250 to send and/or receive data.

Processing device 1210 may reside on a common carrier substrate such as, for example, an integrated circuit ("IC") die substrate, a multi-chip module substrate, or the like. Alternatively, the components of processing device 1210 may be one or more separate integrated circuits and/or discrete components. In one exemplary embodiment, processing device 1210 may be the Programmable System on a Chip ("PSoC®") processing device, developed by Cypress Semiconductor Corporation, San Jose, Calif. Alternatively, processing device 1210 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It will also be noted that the embodiments described herein are not limited to having a configuration of a processing device coupled to the host processor 1250, but may include a system that measures the capacitance on the sense device and sends the raw data to another host computer where it is analyzed by an application. In effect, the processing that is done by processing device 1210 may also be done in the host computer.

It is noted that the processing device 1210 of FIG. 12 may measure capacitance using various techniques, such as self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth). A stylus 1290 used to provide input to the capacitive sensor array 1220 may be active or passive. An example of an active stylus is discussed with respect to FIG. 13. In some embodiments, the processing device 1210 may provide multi-touch capability through simultaneously detecting multiple conductive objects proximate to different regions of the capacitive sensor array 1220. In an embodiment, the processing device 1210 may include and/or provide the functionality of one or more of the sensing module 106, the signal sensor 220, the signal ratio module 222, 322, 622, and 922 the position module 224, 324, 624, and 924, the zone module 623, as and/or the edge module 921 as described with respect to the figures above.

Capacitance sensor 1201 may be integrated into the IC of the processing device 1210, or alternatively, in a separate IC. The capacitance sensor 1201 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 1201 may be generated and compiled for incorporation into other integrated circuits. For example, behavioral level code describing capacitance sensor 1201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1201. It will be noted that the components of the electronic system 1200 may include only some or all the discrete components described above, or some combination thereof.

In one embodiment, electronic system 1200 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Figure 13:
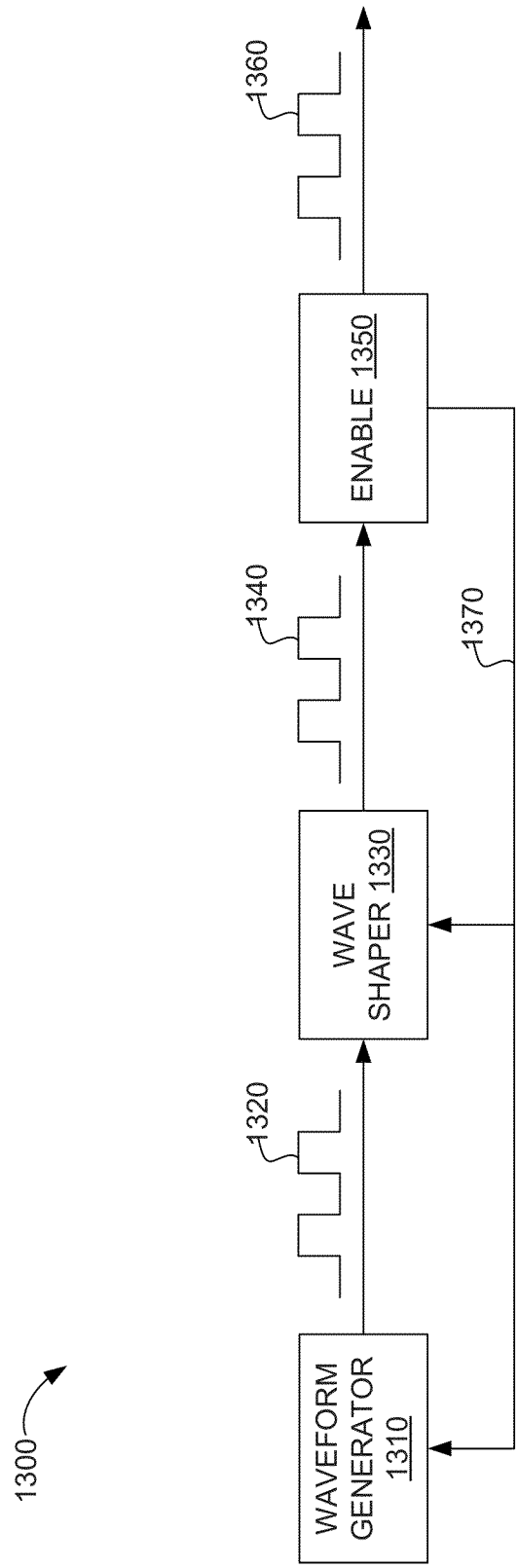
FIG. 13 is a block diagram illustrating one embodiment of a stylus, in accordance with an embodiment.

FIG. 13 is a block diagram illustrating one embodiment of a stylus 1300, in accordance with an embodiment. The stylus 1300 may be an example of the stylus 1290 of FIG. 12. The stylus 1300 is shown to include a waveform generator 1310, a wave shaper 1330, and an enable block 1350. In one embodiment, the waveform generator 1310 is an oscillator. The oscillator may be a crystal, a ceramic resonator, ring oscillator, CPU internal oscillator, relaxation oscillator, or other waveform generating circuits known by those skilled in the art. In an embodiment, the waveform generator 1310 generates a stylus TX signal 1320 and couples it to the wave shaper 1330 for further processing.

The wave shaper 1330 may be configured to shape the frequency, duty cycle, phase, or amplitude of the TX signal 1320 as required by a receiving touch screen controller (e.g., included in the processing device 1210 of FIG. 12). It should be noted that the square wave shape of 1320, 1340, and 1360 is not intended to be indicative of the actual signal waveform, but merely generically indicative of the presence of a signal. The wave shaper 1330 is configured to modulate or encode the TX signal 1320 as described above in conjunction with FIG. 12. In an embodiment, the wave shaper 1330 couples the TX signal 1340 to the enable block 1350. For some applications, the wave shaper 1330 may not be an integral part of TX signal generation. For example, the TX signal 1320 from the waveform generator 1310 may not require additional wave shaping. As such, some embodiments may not require the wave shaper 1330 in the stylus 1300 design.

In an embodiment, the enable block 1350 is configured to enable low power or sleep mode operation. The enable block 1350 may function as a separate block, as shown in FIG. 13, or may be integrated in the waveform generator 1310 or wave shaper 1330 blocks. In an embodiment, the enable block 1350 provides a feedback path to the waveform generator 1310 and/or wave shaper 1330 blocks to control their activity during active and sleep modes. For example, if the enable block 1350 determines that the stylus 1300 should be switched from active to sleep mode due to user inactivity, the enable block 1350 provides a feedback signal 1370 to stop the waveform generator 1310 and wave shaper 1330 from generating a TX signal 1320, 1340. In one embodiment, the enable block 1350 couples the TX signal 1360 to the stylus tip (not shown) in the stylus active mode.

In an embodiment, the stylus 1300 may be powered from a local primary battery, such as one or more AAA cells, button cells, hearing aid batteries, etc. Alternatively, rechargeable cells may be used including, but not limited to, nickel and lithium based batteries, flexible polymer cells, fuel cells, as well as super or ultra-capacitors. The stylus 1300 may also be housed within the touch screen as in a charging station configuration, or receive power through resistive, capacitive or inductive means, as would be appreciated by one having ordinary skill in the art.

In an embodiment, the stylus 1300 is configured to transmit a TX signal 1360 that appears electrically similar to the TX signal provided by the capacitance sensor 1201 of FIG. 12. The stylus 1300 may produces a square wave TX signal 1320, 1340, 1360 in the range of 100 KHz to 300 KHz, although other TX waveforms (e.g., sine, triangle, spread spectrum) and operating frequencies may be used as known by those skilled in the art.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document controls.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
   receiving a plurality of signals respectively from a plurality of capacitive sensors, the plurality of signals responsive to an input object; wherein each of the plurality signals includes a plurality of signal values;
   calculating at least one signal ratio value using at least one signal, of the plurality of signals, which is selected based on a slope of the at least one signal; and
   determining a position of the input object using the at least one signal ratio value.

2. The method of claim 1, wherein the determining of the position of the input object using the at least one signal ratio value includes selecting the position of the input object that corresponds to the at least one signal ratio value.

3. The method of claim 1, wherein the calculating of the at least one signal ratio value includes calculating a ratio of differences between different signals of the plurality of signals.

4. The method of claim 3, wherein the plurality of signals include a first signal, a second signal, and a third signal, and wherein the calculating of the ratio of differences includes dividing a difference between the second signal and the third signal by a difference between the second signal and the first signal.

5. The method of claim 1, wherein the calculating of the at least one signal ratio value includes dividing one of the plurality of signals of the plurality of signals by another signal of the plurality of signals.

6. The method of claim 5, wherein the receiving of the plurality of signals responsive to the input object includes receiving, from a memory, a peak signal value of a sensor and the calculating of the at least one signal ratio value includes dividing the peak signal value by the other signal value of the sensor.

7. The method of claim 1, further comprising selecting, based on at least one signal of the plurality of signals, a plurality of signal ratio values to use to determine the position of the input object, wherein the calculating of the at least one signal ratio value includes calculating the plurality of signal ratio values using the plurality of signals, and wherein the determining of the position of the input object includes using the plurality of signal ratio values.

8. The method of claim 7, wherein each of the plurality of signal ratio values correspond to different positions of the input object, wherein the determining of position of the input object includes calculating the position as a function of the different positions.

9. The method of claim 1, wherein the receiving of the plurality of signals includes receiving the plurality of signal values responsive to an active stylus.

10. An apparatus comprising:
    a signal sensor configured to receive a plurality of signals respectively from a plurality of capacitive sensors, the plurality of signals responsive to an input object, wherein each of the plurality of signals includes a plurality of signal values;
    a signal ratio module coupled to the signal sensor; and
    a position module coupled with the signal ratio module, the signal ratio module configured to calculate at least one signal ratio value using at least one signal, of the plurality of signals, which is selected based on a slope of the at least one signal, the position module configured to determine a position of the input object using the at least one signal ratio value.

11. The apparatus of claim 10, wherein the position module is configured to select the position of the input object that corresponds to the at least one signal ratio value.

12. The apparatus of claim 10, wherein the signal ratio module is configured to calculate the at least one signal ratio value as a ratio of differences between different signals of the plurality of signals.

13. The apparatus of claim 12, wherein the plurality of signals include a first signal, a second signal, and a third signal , and wherein the signal ratio module is configured to calculate the ratio of differences through dividing a difference between the second signal and the third signal by a difference between the second signal and the first signal.

14. The apparatus of claim 10, wherein the signal ratio module is configured to calculate the at least one signal ratio value through dividing one of the plurality of signals by another signal of the plurality of signals.

15. The apparatus of claim 14, further comprising an edge module coupled to the signal sensor, the edge module configured to place a peak signal value of a sensor in a memory, wherein the signal ratio module is configured to calculate the at least one signal ratio value through dividing the peak signal value by the other signal value of the sensor.

16. The apparatus of claim 10, further comprising a zone module configured to select, based on at least one signal of the plurality of signals, a plurality of signal ratio values to use to determine the position of the input object, wherein the signal ratio module is configured to calculate the plurality of signal ratio values using the plurality of signals, and wherein the position module is configured to use the plurality of signal ratio values to determine the position of the input object.

17. The apparatus of claim 16, wherein each of the plurality of signal ratio values correspond to different positions of the input object, wherein the position module is configured to calculate the position of the input object as a function of the different positions.

18. The apparatus of claim 10, wherein the signal sensor is configured to receive the plurality of signals responsive to an active stylus.

19. A sensing system comprising:
a processing device; and
an input module coupled with the processing device, the processing device comprising:
a signal sensor configured to receive a plurality of signals respectively from a plurality of capacitive sensors of the input module, the plurality of signals responsive to an input object, wherein each of the plurality of signals include a plurality of signals values;
a signal ratio module coupled to the signal sensor; and
a position module coupled with the signal ratio module, the signal ratio module configured to calculate at least one signal ratio value using at least one signal, of the plurality of signals, which is selected based on a slope of the at least one signal, the position module configured to determine a position of the input object using the at least one signal ratio value.

20. The system of claim 19, wherein the signal ratio module is configured to calculate the at least one signal ratio value as a ratio of differences between different signals of the plurality of signals.

21. The system of claim 19, wherein the signal ratio module is configured to calculate the at least one signal ratio value through dividing one of the plurality of signals by another signal of the plurality of signal.

22. The system of claim 19, further comprising a zone module configured to select, based on at least one signal of the plurality of signals, a plurality of signal ratio values to use to determine the position of the input object, wherein the signal ratio module is configured to calculate the plurality of signal ratio values using the plurality of signals, and wherein the position module is configured to use the plurality of signal ratio values to determine the position of the input object.

* * * * *